United States Patent
Bascin

(10) Patent No.: US 12,035,436 B2
(45) Date of Patent: Jul. 9, 2024

(54) LAMP SENSOR MODULATION OF A POWER SUPPLY

(71) Applicant: Trojan Technologies Group ULC, London (CA)

(72) Inventor: David Earl Bascin, London (CA)

(73) Assignee: TROJAN TECHNOLOGIES GROUP ULC, London (CA)

(*) Notice: Subject to any disclaimer, the term of this patent is extended or adjusted under 35 U.S.C. 154(b) by 443 days.

(21) Appl. No.: 17/423,771

(22) PCT Filed: Jan. 17, 2020

(86) PCT No.: PCT/IB2020/000066
§ 371 (c)(1),
(2) Date: Jul. 16, 2021

(87) PCT Pub. No.: WO2020/148597
PCT Pub. Date: Jul. 23, 2020

(65) Prior Publication Data
US 2022/0119280 A1    Apr. 21, 2022

Related U.S. Application Data

(60) Provisional application No. 62/794,388, filed on Jan. 18, 2019.

(51) Int. Cl.
*C02F 1/32* (2023.01)
*H05B 47/105* (2020.01)
*H05B 47/19* (2020.01)

(52) U.S. Cl.
CPC ........... *H05B 47/105* (2020.01); *H05B 47/19* (2020.01)

(58) Field of Classification Search
CPC .... C02F 1/32; C02F 1/325; C02F 2201/3227; C02F 2201/3222; C02F 2201/326; H05B 47/105; H05B 47/19; H05B 47/28
See application file for complete search history.

(56) References Cited

U.S. PATENT DOCUMENTS

| | | | |
|---|---|---|---|
| 6,673,250 B2 | 1/2004 | Kuennen et al. | |
| 6,906,337 B2 | 6/2005 | Wedekamp | |
| 6,972,415 B2 | 12/2005 | Schaible et al. | |

(Continued)

FOREIGN PATENT DOCUMENTS

| EP | 2399614 A1 | 12/2011 |
|---|---|---|
| WO | WO2015184019 A1 | 12/2015 |
| WO | WO2017066496 A1 | 4/2017 |

OTHER PUBLICATIONS

Canadian Patent Office, International Search Report, Jun. 11, 2020, 4 pages.

*Primary Examiner* — Jurie Yun
(74) *Attorney, Agent, or Firm* — Ference & Associates LLC

(57) ABSTRACT

A system, method, and assembly for controlling a power supply for at least one ultraviolet lamp where at least one ultraviolet lamp uses input received from at least one sensor of at least one ultraviolet lamp to measure a characteristic of the at least one ultraviolet lamp and, if based on that at least one sensor, the at least one ultraviolet lamp determines that at least one characteristic of a power supply operatively coupled to the at least one ultraviolet lamp should be changed, generates a command for that power supply to modify that at least one characteristic either by modulating its output or adjusting an output level.

21 Claims, 3 Drawing Sheets

(56) References Cited

U.S. PATENT DOCUMENTS

| | | |
|---|---|---|
| 7,490,957 B2 | 2/2009 | Leong et al. |
| 7,759,873 B2 | 7/2010 | Mastenbroek et al. |
| 8,143,803 B2 | 3/2012 | Beij et al. |
| 8,785,868 B2 | 7/2014 | Yang et al. |
| 9,084,313 B2 | 7/2015 | Praske et al. |
| 9,363,873 B2 | 6/2016 | Van Eerden et al. |
| 9,738,547 B2 | 8/2017 | Schmitt et al. |
| 9,860,961 B2 | 1/2018 | Chemel et al. |
| 2004/0061069 A1 | 4/2004 | Schalble et al. |
| 2006/0049360 A1 | 3/2006 | Schoenlein et al. |
| 2007/0086912 A1 | 4/2007 | Dowling et al. |
| 2008/0290814 A1 | 11/2008 | Leong et al. |
| 2012/0175524 A1 | 7/2012 | Greuel |
| 2014/0091236 A1 | 4/2014 | Jhawar et al. |
| 2016/0023924 A1 | 1/2016 | Schmitt et al. |
| 2018/0112837 A1 | 4/2018 | Sadwick |
| 2018/0228000 A1 | 8/2018 | Aykroyd et al. |

# LAMP SENSOR MODULATION OF A POWER SUPPLY

CLAIM FOR PRIORITY

This application claims priority to U.S. Provisional Application No. 62/794,388 filed on Jan. 18, 2019, entitled "LAMP SENSOR MODULATION OF A POWER SUPPLY", which is incorporated by reference herein in its entirety.

FIELD

This application relates generally to water quality treatment, and, more particularly, to ultraviolet light treatment of an aqueous fluid.

BACKGROUND

The proper disinfection of water is critical to ensure water quality. As the need for cleaner sources of water has increased, water disinfection methods had evolved to match the rising challenge. Water supplies may contain heavy metals, sediment, chemicals, pesticides, or the like. Water sources may also contain pathogens such as microorganisms, viruses, or the like. Left untreated, such water may be unhealthy or unsafe for use by humans or animals. Ultraviolet (UV) light treatment of water may be used to inactivate pathogens. Water may pass through a small chamber or a larger vessel where the water is subjected to UV light. The UV treatment may damage nucleic acids of the pathogens. The disruption of the genetic material may render the pathogens incapable of performing vital cellular functions, thereby rendering them harmless. Thus, this UV process may make water potable despite the water source containing microorganisms, viruses, or the like.

UV treatment may be used in residential, commercial, industrial, agricultural, medical, food processing facilities, or the like. UV treatment may be used for water re-use, soil decontamination, and waste-water treatment applications. UV may also be used to treat contaminants in water, such as trace amounts of pesticides, solvents, or other organic molecules. In this case, the UV wavelengths are used to directly affect chemical bonds of the contaminant, a process called photolysis, or by acting on water itself to create radical species, or by converting an added chemical such as hydrogen peroxide or ozone to a radical species such as OH radicals that react with the contaminant to convert it to compounds that are more desirable.

BRIEF SUMMARY

In summary, one embodiment provides a method for controlling a power supply for at least one ultraviolet lamp, comprising: identifying, based upon input received from at least one sensor of at least one ultraviolet lamp, a characteristic of the at least one ultraviolet lamp; producing, from the at least one ultraviolet lamp, a command based upon the characteristic, wherein the command comprises a command to control at least one characteristic of a power supply operatively coupled to the at least one ultraviolet lamp; and modulating, based upon the command, the power supply.

Another embodiment provides an ultraviolet lamp system for modulating a power supply, comprising: at least one sensor; at least one source of ultraviolet radiation operatively coupled to the at least one sensor; a processor operatively coupled to the at least one source of ultraviolet radiation; and a memory device that stores data and instructions executable by the processor to: identify, based upon input received from the at least one sensor, a characteristic of the at least one source of ultraviolet radiation; produce, from the at least one source of ultraviolet radiation, a command based upon the characteristic, wherein the command comprises a command to control at least one characteristic of a power supply operatively coupled to the ultraviolet lamp system; and modulate, based upon the command, the power supply.

A further embodiment provides a product for controlling a power supply for at least one ultraviolet lamp, comprising: a storage device having code stored therewith, the code being executable by the processor and comprising: code that identifies, based upon input received from at least one sensor of at least one ultraviolet lamp, a characteristic of the at least one ultraviolet lamp; code that produces, from the at least one ultraviolet lamp, a command based upon the characteristic, wherein the command comprises a command to control at least one characteristic of a power supply operatively coupled to the at least one ultraviolet lamp; and code that modulates, based upon the command, the power supply.

An even further embodiment provides an ultraviolet lamp assembly for modulating a power supply, comprising: a sensor comprising at least an electrical current sensor, an electrical voltage sensor, or a power usage sensor; a lamp comprising a source of ultraviolet radiation operatively coupled to the sensor; a processor operatively coupled to the lamp; and a memory device that stores data and instructions executable by the processor and configured to: identify, based upon input received from the sensor, a characteristic of the source of ultraviolet radiation; produce, from the processor, a command based upon the characteristic, wherein the command comprises a command to control a characteristic of a power supply operatively coupled to the ultraviolet lamp assembly; and modulate, based upon the command, the power supply.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
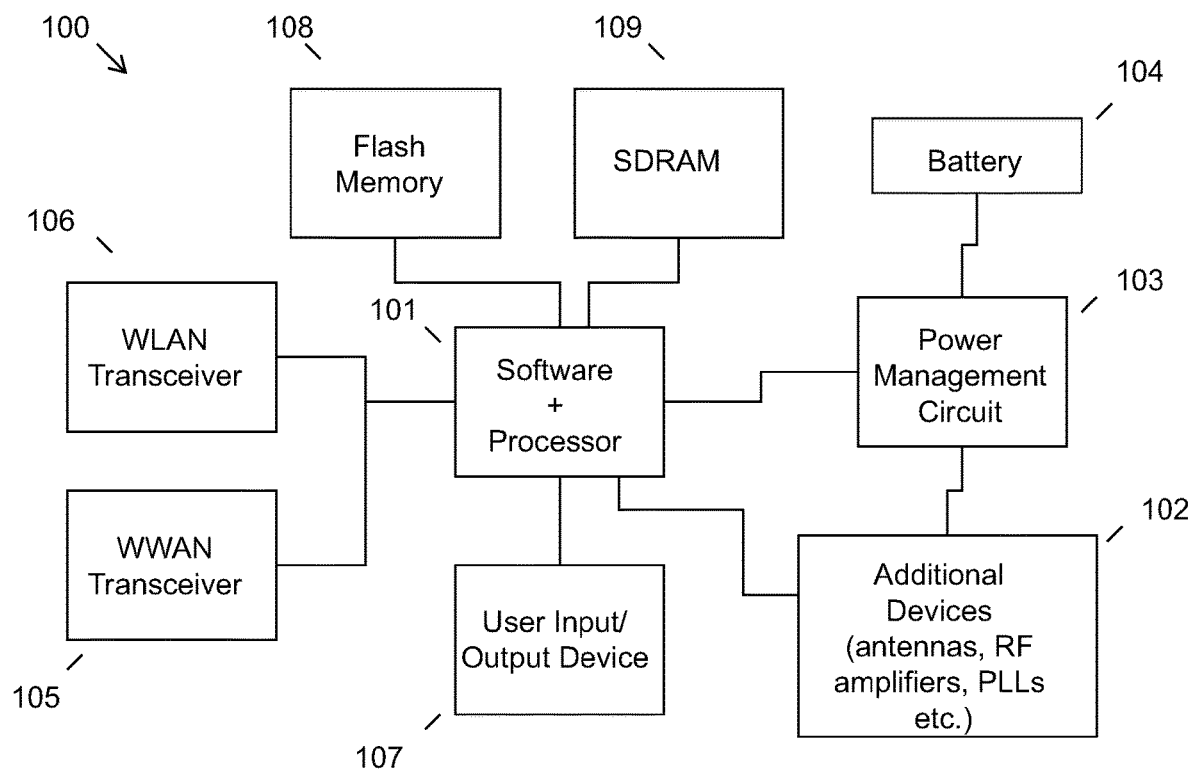
FIG. 1 illustrates an example of computer circuitry

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

UV water treatment systems are a cost effective and efficient method to treat water containing biological contaminants. One treatment includes UV disinfection. UV disinfection may protect against water borne viruses, bacteria, molds, or the like. Additionally, UV disinfection may be effective against disease causing organisms such as *Giardia* and *Cryptosporidium*. Proper control of UV light delivered to a volume of water may be essential to the proper treatment of the water. In other words, effective exposure of contaminated water to a UV source may be critical to proper disinfection of a water source. While the majority of this discussion is directed toward UV disinfection, it should be understood that the method and system as described herein extends to any UV treatment, not just disinfection.

UV wavelength may be in the range of 100 to 400 nanometers, which can be provided by a variety of UV light sources, for example, UV light emitting diodes (LEDs), arc lamps, mercury vapor lamps, or the like. Conventional UV light source arrangements vary depending on the application. For example, a residential UV light source may be used to treat well water or other non-municipal water source. Residential units may have a chamber containing a UV light source piped in-line between a water source, such as a well, and the household piping. A residential system may have one or more UV lights that expose the water to UV light as the water passes through the UV purification chamber. Residential systems may be designed for the relatively lower volume of water used by a home as compared to a larger industrial or commercial UV treatment system. Larger UV treatment systems may be found in industrial or commercial facilities such as a municipal water treatment facility. The larger systems may handle large volumes of water, and may, therefore, have a plurality of UV lamps, for example, as arranged in an array. These UV light sources may be arranged in or around vessels of water to be treated with UV light. Commercial systems may have multiple vessels or tubes through which water passes for UV treatment.

For ease of readability, this disclosure focuses mainly, but not solely, on the application of UV treatment of water for the disinfection of drinking water. However, other implementations of the systems and methods described herein are possible and contemplated. For example, since UV light may be used to disinfect surfaces, the described systems and methods may be used in such an application. These surfaces may include areas used to prepare sensitive materials in which organisms or organic residue would contaminate the surface such as a biological hood, surgical suite, food preparation area, clean room, or the like. Additionally, the described system and method may be used for the disinfection of pool water, the disinfection of a gas (e.g., UV light may be used to purify air), contaminated soil, in advanced oxidation or environmental contaminant treatment (ECT) applications, ionization of organic molecules, and the like. Thus, the examples described herein regarding the disinfection of water are merely illustrative. Other uses are contemplated and disclosed.

Conventional UV disinfection systems do have some drawbacks. UV disinfection may rely on the ability of a proper amount of UV light to reach the volume of water to be treated. For example, a UV lamp must have the proper output of UV light to be effective. If a UV lamp has become worn or begins to fail or malfunction, the water may not be properly treated, because the UV lamp is no longer emitting a necessary amount of UV light. In other words, a UV lamp may degrade over time and, thereby, reduce the UV light output provided by the UV lamp. Also UV lamps may be installed in a severe environment, which may also cause or accelerate degradation of the UV lamp. For example, due to the nature of the application, UV lamps may be placed very close to or even in a volume of water. Environmental conditions such as temperature, humidity, vibration, or the like, may degrade or damage a UV lamp. A degraded lamp may result in microorganisms remaining viable in the treated water.

To account for these UV lamp degradations, conventional systems use a power supply that changes the power output over time, specifically, by increasing the power output in order to increase the power to the UV lamp with the objective of keeping the UV light output consistent. The UV treatment system power levels are programmed based upon predetermined profiles of UV lamp output as a function of time. In other words, studies are performed on the UV lamps to determine when the UV lamps start to degrade. These output profiles are then used to program the UV system power levels which determine power supply levels, to account for this degradation. Unfortunately, this technique assumes a consistent degradation across all UV lamps, which may not be accurate. Thus, to account for the fact that some UV lamps may degrade faster, the UV treatment system power levels are generally programmed to overdrive the UV lamps. In other words, the power supplies provide "extra" power, thereby causing the UV lamp output to be greater than what is necessary for effective treatment of the water. This overdriving of the UV lamps results in extra electricity expenses, causes the UV lamps to fail quicker, and causes more downtime for replacement of the UV lamps.

Variable losses incurred in power transfer from the power supply to the lamps may also be included when setting power levels. Conventional UV treatment systems incorporating UV lamps may have power distribution to the UV lamps from the power supply including one or more connectors and cables. The power distribution may introduce significant energy losses in the electrical path from power supply to UV lamp. Some conventional UV treatment systems have the power supplies located at various distances from the UV lamps, resulting in an installed distribution power loss to the UV lamps. In the conventional UV systems the power supply output may have a power level setting which is pre-set to compensate for anticipated worst-case power losses in the distribution to the UV lamps. This conservative, but necessary, operational mode results in higher cost for wasted power, early lamp failures, and greater downtime.

Conventional power supplies may monitor electrical characteristics at their output and modulate their operation to reach a desired output power level. To modulate includes, but is not necessarily limited to, controlling any characteristic of the power supply such as current, voltage, power, frequency, and the like. However, this local power measurement cannot determine the power at the UV lamp. Any losses in the power distribution cables and connectors cannot be readily detected by the power supply, leading to non-optimal operation of the UV lamp.

Accordingly, the systems and methods described herein provide a technique for a lamp to modulate a power supply based upon UV lamp characteristics and operating requirements. In other words, rather than the power supply driving the UV lamps based upon profile curves or predetermined over-drive for installation energy distribution losses, the lamp can measure characteristics of itself, for example, UV light output values, current values, voltage values, temperature values and the like, and use this information to provide commands to modulate the power supply until the UV lamp determines that it is providing the required UV light output or electrical power, independent of lamp age, lamp variability, connection losses and the like. The lamp may be an arc lamp, UV LED, or the like. The term "lamp" will be used herein throughout for ease of readability. However, it should be understood by one skilled in the art that the ultraviolet radiation source may include any of the aforementioned devices (e.g., arc lamp, UV LED, etc.) or any other ultraviolet radiation source.

In an embodiment, the system and method may identify at least one characteristic of the at least one ultraviolet lamp. The identifying may be based upon input received from at least one sensor of a UV lamp. A sensor may receive input regarding a lamp with respect to operating conditions, environment, or the like. In an embodiment, the system and method may send, from the UV lamp, a command or control signal, based upon the sensed characteristic or characteristics, to a processor. In one embodiment the processor may be included within a control module. The control module may include components included on the lamp, on the power supply, and/or independent of either or both the lamp and power supply The command may control one or more characteristics of a power supply, for example modulating the power output of at least one power supply.

The illustrated example embodiments will be best understood by reference to the figures. The following description is intended only by way of example, and simply illustrates certain example embodiments.

While various other circuits, circuitry or components may be utilized in information handling devices, with regard to an instrument for water treatment according to any one of the various embodiments described herein, an example is illustrated in FIG. 1. Device circuitry 100 may include a measurement system on a chip design found, for example, a particular computing platform (e.g., mobile computing, desktop computing, etc.) Software and processor(s) are combined in a single chip 101. Processors comprise internal arithmetic units, registers, cache memory, busses, I/O ports, etc., as is well known in the art. Internal busses and the like depend on different devices that vary by chip manufacturer, but essentially all the peripheral devices (102) may attach to a single chip 101. The circuitry 100 combines the processor, memory control, and I/O controller hub all into a single chip 101. Also, systems 100 of this type do not typically use SATA or PCI or LPC. Common interfaces, for example, include SDIO and I2C.

There are power management chip(s) 103, e.g., a battery management unit, BMU, which manage power as supplied, for example, via a rechargeable battery 104, which may be recharged by a connection to a power source (not shown). In at least one design, a single chip, such as 101, is used to supply BIOS like functionality and DRAM memory.

System 100 typically includes one or more of a WWAN transceiver 105 and a WLAN transceiver 106 for connecting to various networks, such as telecommunications networks and wireless Internet devices, e.g., access points. Additionally, devices 102 are commonly included, e.g., a transmit and receive antenna, oscillators, RF amplifiers, PLLs, etc. System 100 includes input/output devices 107 for data input and display/rendering (e.g., a computing location located remotely from the lamp or lamp array). System 100 also typically includes various memory devices, for example flash memory 108 and SDRAM 109.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform treatment of an aqueous fluid.

Figure 2:
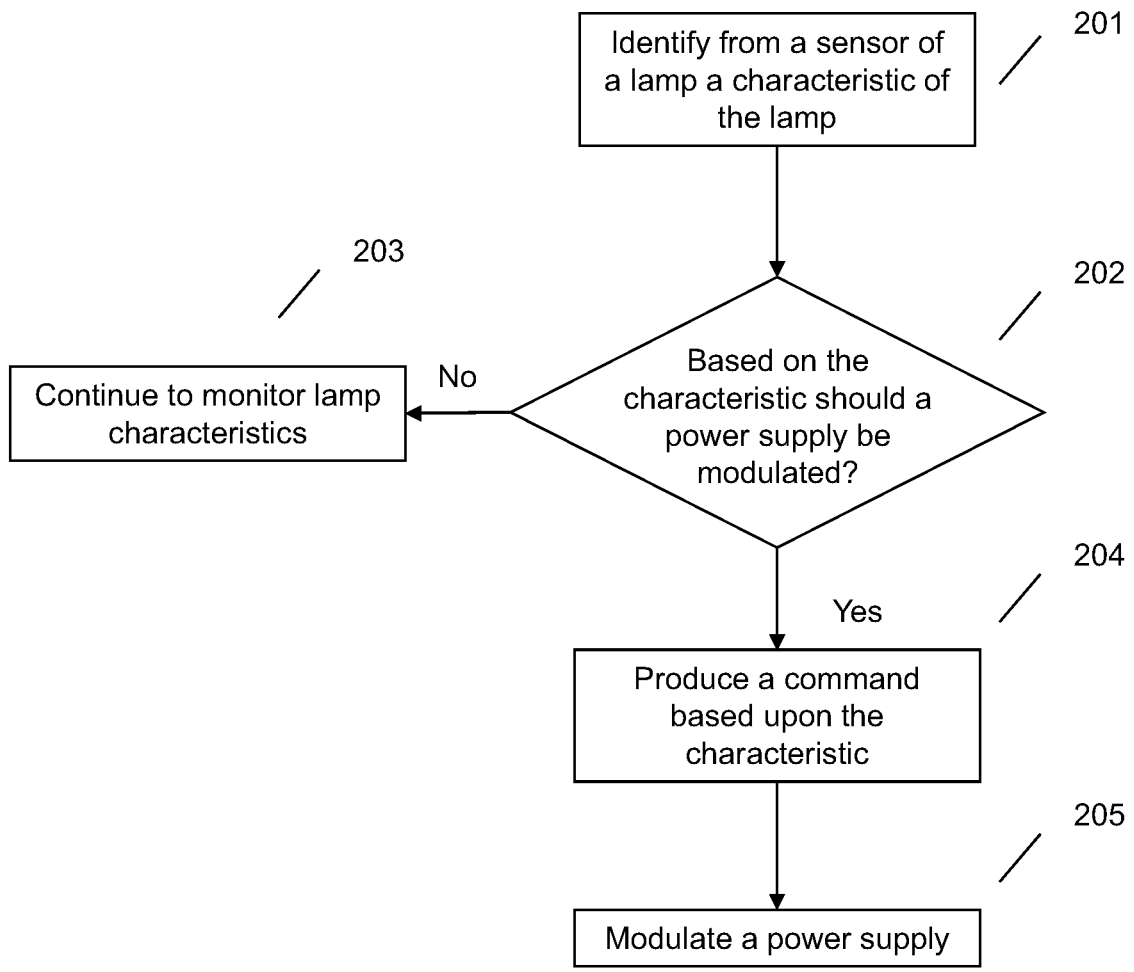
FIG. 2 illustrates a flow diagram of an example lamp sensor modulation of a power supply.

Referring now to FIG. 2, an embodiment may modulate at least one power supply based upon input received from at least one sensor of at least one lamp. In an embodiment, a characteristic of the at least one lamp may be identified based upon input received from at least one sensor. Input from at least one sensor may include characteristics of at least one lamp. In an embodiment, a command or control signal based upon a characteristic may be sent to a processor that is able to analyze and process the command in order to provide a signal or command to modulate the power supply. A command may control a characteristic of a power supply operatively coupled to a lamp. In an embodiment, at least one power supply may be modulated based upon a command. In an embodiment, the lamp or plurality of lamps may be a UV lamp, UV LED, or the like. The UV lamp may be used for the treatment of water in a treatment facility, a UV lamp for disinfection of a surface, environment, liquid, or gas. The systems and methods described herein may be used to modulate any power supply operatively coupled to a UV light source based upon characteristics of the UV light source and commands that are provided by the UV light source.

Characteristics of a lamp may be critical for lamp function within a system. For example, UV lamps may purify water in a treatment facility and the facility may have a large number of lamps within the facility. The facility may wish to ensure proper operation of one or more lamps for proper water treatment. If a facility detects an inoperable or sub-optimal lamp quickly, then the facility may take corrective action. The system and method described herein may allow for a faster identification of a faulty lamp because the lamp itself can identify issues with the UV light output, temperature, or electrical characteristics of the lamp. When combined with conventional diagnostics in the power supply, defects in interconnecting cables and connectors may be detected, for example by differences between voltage at the power supply and at the lamp. Thus, the described system may lower costs through lower personnel hours spent on diagnostic activities. The system may also save on electrical costs, replacement cost of lamps, or the like. Additionally, since lamps may be installed in a harsh environment, the condition of the environment may require monitoring. For example, lamps may be subjected to extreme temperature, humidity, vibration, or the like. Characteristics provided from sensors of the lamp may identify characteristics of a lamp environment to a system. A sensor may be located in various locations within the radiation source assembly, for example, within the lamp enclosure itself, in a position close to a lamp within the assembly, in a lamp assembly, or the like.

Accordingly, at 201, in an embodiment, a characteristic of at least one UV lamp may be identified. The characteristic may be received from at least one sensor of at least one UV lamp. In other words, the UV lamp may contain circuitry (e.g., sensors, processors, etc.) that allows the UV lamp to sense or obtain information about itself or an environment of the UV lamp. The characteristic may be from a sensor that allows for detection or identification of an operating condition of the lamp. An operating condition may include information such as manufacturing date of a lamp, time of use of a lamp, number of cycles of a lamp, temperature of a lamp, power usage of a lamp, or the like. In other words, a sensor on or coupled to the lamp may provide information based upon the operating conditions of a lamp such as how long a lamp is on or off, how many times the lamp cycles between on and off conditions, a temperature of the lamp assembly or filament, how much electricity a lamp is consuming, light output, or the like. Thus, the sensor may include a temperature sensor, current sensor, arc voltage sensor, filament voltage sensor, cycle counter, or any other sensor that can be used to detect operating condition parameters.

In an embodiment, a characteristic may be from a sensor that allows for detection or identification of an environmental condition of a lamp. An environmental condition of a lamp may include information such as location, position, orientation, temperature, humidity, pressure, or the like. In other words, an environmental condition may include information relating to an environment of a lamp. An environment may include positional information, movement, condition of the surrounding environment, or the like, of the lamp. Thus, the sensor may include an accelerometer, gyroscope, pressure sensor, humidity sensor, or any other sensor that can be used to detect environmental conditions.

At 202 the system may determine if the characteristic identifies that a characteristic of the power supply connected to the lamp should be modified. This determination may be made by comparing the characteristic to a threshold value. For example, a processor may modulate power output when an input from a sensor reaches a temperature threshold, an hour limit, or the like. As an example, if the characteristic is a temperature characteristic, the system may compare that temperature value to an expected temperature value, which may have an associated temperature range. If the temperature value is outside the range, either high or low, the system may then determine that a characteristic of the power supply should be modified. If, on the other hand, the temperature value is within the range, the system may determine that a characteristic of the power supply does not need to be modified. The example of a temperature value is used, but it should be understood that such a determination can be made for any of the characteristics that can be sensed or detected by the lamp, for example, power consumption, humidity, any of the other characteristics mentioned above, or the like.

The determination may also be made by comparing the characteristic to historical data, user input, or the like. For example, the processor may compare the characteristic to historical data to see if the characteristic is trending in one direction or another. If the characteristic appears to be trending down, for example, the system may determine that a characteristic of the power supply should be modified to stop the characteristic from continuing to trend down. The processor may use historical data such as typical lamp use, conditions under which a lamp may fail, typical lamp output characteristics, historical characteristics of the lamp, or the like to determine if the power supply may be modulated. As another example, the processor may compare the characteristic to a user provided set point or other input previously retrieved by the processor. If the characteristic does not match the user set point, the system may determine that a characteristic of the power supply should be changed to account for the deviation from the user set point.

If the system determines that no power supply characteristics should be changed, the system may continue to monitor lamp characteristics at 203. If, on the other hand, the system determines that a power supply characteristic needs to be changed, the system may, at 204, produce a command or control signal at the lamp. In an embodiment, a command or control signal may be sent to a processor, control module, and/or directly to the power supply. The processor may be located within the lamp enclosure, connected to an output of the lamp, located within a power supply, or otherwise operatively coupled to the lamp. The processor may be a component of a control module. The control module may include multiple components, with components located in the lamp, in the power supply, independent from the lamp and/or power supply, or the like.

In an embodiment, the command may be a command that is used to control a characteristic of a power supply. For example, the command may be an output from the lamp that is then processed by the processor to control a characteristic of a power supply that is supplying power to the lamp. The command may be responsive to the input from at least one sensor associated with the lamp. For example, a lamp may be associated with a sensor that measures temperature. If the sensor detects a temperature of the lamp that is above a predetermined threshold, the lamp may send a command to the processor, which can then send the signal or generate a new signal that is then sent to the power supply to decrease power to the lamp, thereby reducing the temperature of the lamp. As another example, if a sensor of the UV lamp provides a signal indicating that the UV light output is less than a predetermined threshold, the UV lamp may send a signal or command to the processor, which can then send the signal or generate a new signal that is then sent to the power supply to increase the power output of the power supply, thereby increasing the UV light output of the lamp. As another example, if a sensor of the UV lamp which has filaments provides a signal indicating that filament temperature is below a predetermined threshold, the lamp may send a command to a processor, which can then send the signal or generate a new signal that is then sent to the power supply to increase the filament power, thereby increasing the filament temperature. A sensor may provide any characteristic for which the sensor is sensitive. Characteristics may include parameters discussed herein.

As a further example, the lamp could send a command to the processor to modulate the power supply causing the power supply to change the output to the lamp from constant-power to constant-current mode along with a current or power level command determined by the lamp, then the lamp may read sensors and later change the command to the processor to modulate the power supply causing the power supply to return to the constant-power or constant-current mode with a command to modulate the power supply derived from the sensor readings taken while the modulation was altered. It should be clear to those versed in the state of the art that such modulation to change the output characteristics of the power supply may be used by the lamp to sense changes in the conditions of the lamp and/or it's environment, for example, changing discharge-lamp arc voltage aging effects etc. and other such uses of programmed modulation of the power supply by the lamp should be obvious. It should be clear to those versed in the state of the art that modulation could include more complex programmed sequences of power supply output, such as the power supply being commanded to modulate the output to the lamp by means of an alternate modulation mode or level for example constant current for some parameterized or predetermined duration then returning to the prior or another alternate modulation mode such as constant power or other mode thus realizing a sequence of power supply output modulations commanded by the lamp.

The processor may be located in the radiation source assembly, for example, within a lamp enclosure, in a position close to the lamp within the radiation source assembly, in a lamp assembly, in the power supply, or the like. In the example shown in FIG. 3, explained in more detail below, the processor is housed within the lamp housing. However, the processor may be located proximate to the lamp housing, within the lamp array, or the like. In other words, the processor is operatively coupled to a lamp. Additionally, as discussed herein, the system may include more than one processor, with one of the processors within or proximate to the lamp and another processor located in a remote location. Nonetheless, regardless of the location of the lamp processor, the lamp receives signals from sensors associated with the lamp, or a lamp array, and then sends signals (which may include the signals received from the sensors or signals that are derived from the sensor signals) to modulate the power supply. In an embodiment, the processor may be associated with a single lamp. Alternatively, a processor may be associated with an array or plurality of lamps. For example, the processor could receive and process signals from more than one lamp, for example, all the lamps within the radiation source assembly. A processor may process commands from at least one lamp. Commands from at least one lamp may be communicated to at least one processor in many ways. For example, commands from a lamp may be sent via wires that are separate from electrical power wires, using the same power wires (e.g. inductive communication), by wireless communication methods, or the like.

Figure 3:
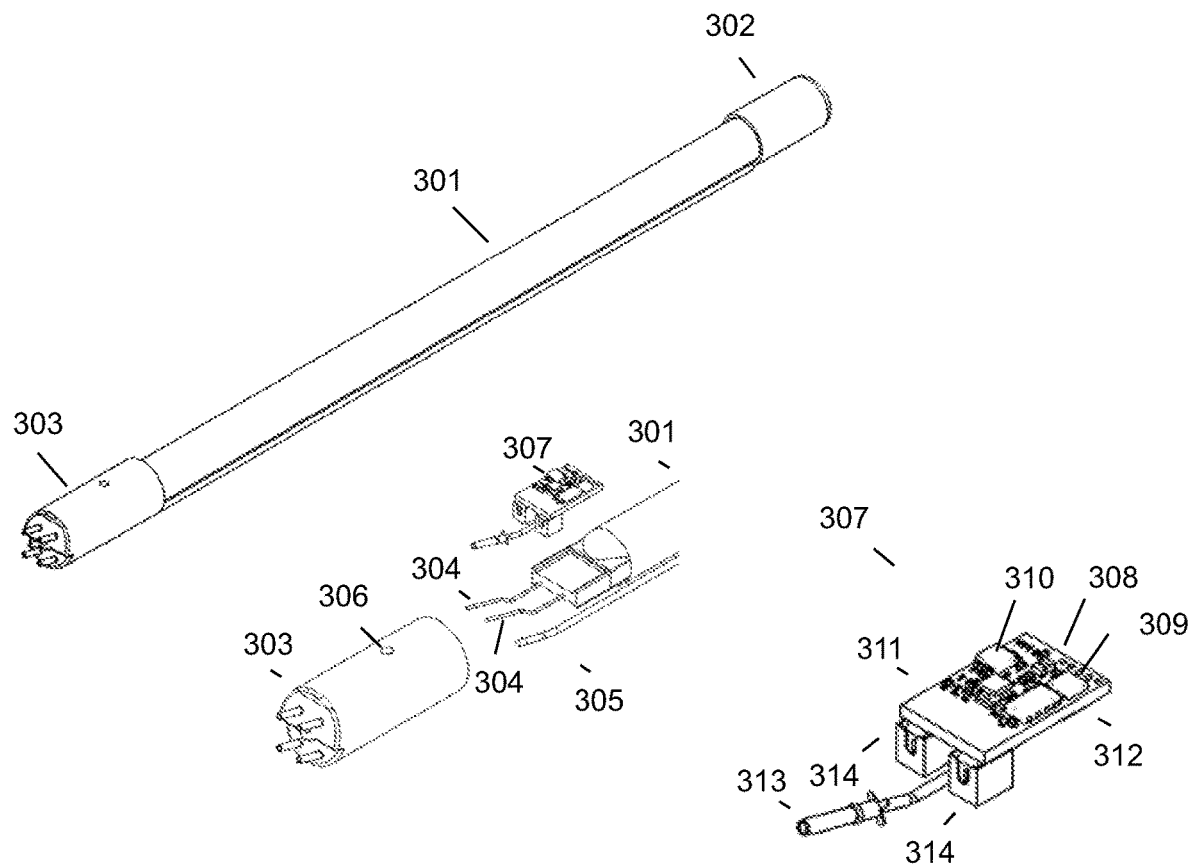
FIG. 3 illustrates an example lamp with sensors that modulates a power supply.

Referring to FIG. 3, an example embodiment of a lamp assembly is shown. While in this example embodiment a gas discharge lamp with filaments at each end of the lamp is used it should be obvious to those skilled in the art that the assembly combining the lamp, sensor or sensors, and circuit assembly or circuit assemblies may be used in an application with any type of UV light source whether a gas discharge lamp, UV LED, or any other type of UV light source, and such assembly could be implemented using a single such UV light source of any type or combination of types of one or more UV light sources in an array or cluster.

The example embodiment in FIG. 3 includes a UV lamp 301, lamp base with pins 303, and lamp base 302. This assembly includes a sensor opening 306 in the lamp base with pins 303 and the circuit assembly 307 which, when fully assembled, is covered by the lamp base with pins 303.

The sensor opening 306 may be used to expose sensors to the UV lamp 301 and its environment. In this example embodiment the circuit assembly 307 is constructed by soldering components on a printed circuit substrate 311 and includes a microcontroller unit (MCU) 310, UV sensor 308, humidity sensor 309, and accelerometer 312. Those skilled in the art will be aware that any sensors of the environment and the UV lamp 301 for electrical, optical, or physical conditions can be integrated into the assembly.

The circuit assembly 307 in this embodiment includes a data pin 313 which when fully assembled is inserted into the lamp base with pins 303. The circuit assembly 307 has in this case two terminals 314 which when fully assembled the filament wires 304 are pressed into the terminals 314. Thus, in this embodiment, the circuit assembly 307 has access to electrically sense the electrical signal on the filament wires 304 and at the same time use one or both of the filament wires 304 along with the data pin 313 to be powered by and communicate commands to any combination of an external control module or external power supply that powers the lamp.

In this example embodiment, the lamp base with pins 303 has the filament wires 304 attached to the pins along with the long filament wires 305. The long filament wires 305 connect only to the pins in the lamp base with pins 303.

It should be clear to those versed in the state of the art that a wired communication and lamp power interface such as this embodiment could have one or more external control modules and/or processors connected to it along with the power supply that powers the lamp. It should further be obvious that the circuit assembly 307 could be powered by the external control module or modules and/or processor(s), the external power supply that powers the lamp, or any combination thereof. As an example the external control module could power the circuit assembly 307 and be commanded by the circuit assembly 307 to modulate the external lamp power supply that powers the lamp.

In another example this embodiment could be connected to an external power supply that powers this lamp 301 and is capable of being modulated directly by commands sent from the circuit assembly 307 via the data pin 313 and one or more of the filament wires 304.

The command produced by the lamp and sent to the control module, processor, and/or power supply at 204 from the lamp may then be used to modulate a power supply at 205. In other words, the lamp may provide a command which is then sent to the processor, control module, or directly to the power supply, to modulate the power supply, resulting in a corrective action responsive to the input received from at least one sensor associated with at least one lamp. For example, the control module may forward the command received from the lamp to the power supply, the control module may process the command and then send an output to the power supply based upon the processed command, or the like. For example, a sensor may collect information on the numbers of hours a lamp has been turned on. The system may have a predetermined threshold for number of hours of service life a lamp may have. If a lamp is nearing the end of a service life, then the lamp may determine the lamp is nearing an hour limit, and send a command to the processor or power supply to turn off, reduce power, or the like, to the lamp nearing the hour limit.

Additionally or alternatively, the system may send a command to a processor or power supply of a lamp that has a decrease in UV light output commanding it to increase power to the lamp. Hour usage is an illustrative example, and other sensors with other associated lamp characteristics are disclosed.

In an embodiment, the modulation of a power supply may bring a lamp back to a desired range of a functioning parameter. In other words, the lamp may send a signal in response to a sensor reading to the power supply that modulates the power supply in order to adjust a characteristic of the lamp, for example, to bring the characteristic of the lamp back within a desired range or back to a desired value. For example, if a sensor associated with a lamp receives input that the lamp is undergoing a high level of vibration, then the system may send a command to the power supply to reduce power to that lamp to prevent a burnout of the lamp. The system may then continue to monitor vibration of that lamp and modulate the power supply to return the power to the lamp once vibration of the lamp has returned to normal or lower levels. Thus, the lamp is able to provide instructions to the power supply so that the lamp can achieve maximum useful lifespan. Modulation of the power supply may include modulating power output, modulating current output, modulating voltage output, modulating power supply cycles or cycle times, output pulse width or duty cycle, or modulating any other characteristic of the power supply.

In an embodiment, there may be communication between a plurality of sensors, lamps, control modules, processors, and power supplies. For example, if at least one sensor associated with a lamp indicates that that the lamp is outside of a desired characteristic, one or more systems associated with another lamp or plurality of lamps may receive a command to compensate for the loss of function of the lamp. In other words, UV treatment systems may be designed with redundancy using more lamps or multiple systems that may compensate for a failure or reduced performance of one or more lamps. In this manner input from a sensor of a lamp outside normal characteristics may lead to modulation of a power supply for properly functioning lamps. The communication between the components may be at the processor, control module, or power supply level.

The system may connect to a communication network. The system may alert a user or a network. This alert may occur whether a power supply modulation occurs or not. An alert may be in a form of audio, visual, data, storing the data to a memory device, sending the output through a connected or wireless system, printing the output or the like. The system may log information such as a sensor output value, location, a corrective action, time, date, number of cycles, or the like. The alert or log may be automated, meaning the system may automatically output whether a correction was required or not. The system may also have associated alarms, limits, or predetermined thresholds. Alarms or logs may be analyzed in real-time, stored for later use, or any combination thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a serial connection such as USB or RS485 connections.

Example embodiments are described herein with reference to the figures, which illustrate example methods, devices and products according to various example embodiments. It will be understood that the actions and functionality may be implemented at least in part by program instructions. These program instructions may be provided to a processor of a device or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for controlling a power supply for at least one ultraviolet lamp, comprising:
   identifying, based upon input corresponding to at least one ultraviolet lamp and received from at least one sensor located on the at least one ultraviolet lamp, a characteristic of the at least one ultraviolet lamp, wherein the characteristic comprises at least one of: an operating condition of the at least one ultraviolet lamp and an environmental condition of the at least one ultraviolet lamp;
   producing, from the at least one ultraviolet lamp, a command based upon the characteristic, wherein the command comprises a command to control at least one characteristic of a power supply operatively coupled to the at least one ultraviolet lamp; and modulating, based upon the command, the power supply.

2. The method of claim 1, wherein the at least one ultraviolet lamp comprises an ultraviolet lamp located in a water filtration system.

3. The method of claim 1, wherein the at least one ultraviolet lamp comprises a light emitting diode.

4. The method of claim 1, wherein the at least one sensor comprises at least one operating conditions sensor selected from the group consisting of: an hours of use sensor, a number of cycles sensor, a temperature sensor, an optical intensity sensor, an electrical current sensor, an electrical voltage sensor, and a power usage sensor.

5. The method of claim 1, wherein the at least one sensor comprises at least one environmental conditions sensor selected from the group consisting of: a location sensor, a position sensor, an orientation sensor, a temperature sensor, a humidity sensor, a pressure sensor, a gyroscope sensor, and an acceleration sensor.

6. The method of claim 1, wherein the identifying a characteristic comprises identifying that a characteristic of the at least one ultraviolet lamp is outside a predetermined operating range.

7. The method of claim 6, wherein the command comprises a command to a processor to modulate an output of the power supply to bring the characteristic of the at least one ultraviolet lamp within the predetermined operating range.

8. The method of claim 1, wherein a processor is located within a control module that communicates with the power supply and wherein at least a portion of the control module is located within the power supply.

9. The method of claim 1, wherein the command comprises a control signal communicated using at least one of: at least one lamp filament wire of the at least one ultraviolet lamp, at least one signal wire, and wireless communication protocol.

10. The method of claim 1, wherein the at least one ultraviolet lamp is located within an array of ultraviolet lamps and wherein characteristics of the array of ultraviolet lamps are communicated among the array.

11. An ultraviolet lamp system for modulating a power supply, comprising:
at least one source of ultraviolet radiation;
at least one sensor located on the at least one source of ultraviolet radiation;
a processor operatively coupled to the at least one source of ultraviolet radiation; and
a memory device that stores data and instructions executable by the processor to:
identify, based upon input corresponding to the at least one source of ultraviolet radiation and received from the at least one sensor, a characteristic of the at least one source of ultraviolet radiation, wherein the characteristic comprises at least one of: an operating condition of the at least one source of ultraviolet radiation and an environmental condition of the at least one source of ultraviolet radiation;
produce, from the at least one source of ultraviolet radiation, a command based upon the characteristic, wherein the command comprises a command to control at least one characteristic of a power supply operatively coupled to the ultraviolet lamp system; and
modulate, based upon the command, the power supply.

12. The system of claim 11, wherein the at least one source of ultraviolet radiation comprises an ultraviolet lamp located in a water filtration system.

13. The system of claim 11, wherein the at least one source of ultraviolet radiation comprises a light emitting diode.

14. The system of claim 11, wherein the at least one sensor comprises at least one sensor selected from the group consisting of: an hours of use sensor, a number of cycles sensor, a temperature sensor, an optical intensity sensor, an electrical current sensor, an electrical voltage sensor, a power usage sensor, a location sensor, a position sensor, an orientation sensor, a temperature sensor, a humidity sensor, a pressure sensor, a gyroscope sensor, and an acceleration sensor.

15. The system of claim 11, wherein the identifying a characteristic comprises identifying that a characteristic of the at least one source of ultraviolet radiation is outside a predetermined operating range.

16. The system of claim 15, wherein the command comprises a command to the processor to modulate an output of the power supply to bring the characteristic of the at least one source of ultraviolet radiation within the predetermined operating range.

17. The system of claim 11, wherein the processor is located within a control module that communicates with the power supply and wherein at least a portion of the control module is located within the power supply.

18. The system of claim 11, wherein the command comprises a control signal communicated using at least one of: at least one lamp filament wire of the at least one source of ultraviolet radiation, at least one signal wire, and wireless communication protocol.

19. The system of claim 11, wherein the at least one source of ultraviolet radiation is located within an array of ultraviolet radiation sources and wherein characteristics of the array of ultraviolet radiation sources are communicated among the array.

20. An ultraviolet lamp assembly for modulating a power supply, comprising:
a sensor comprising at least an electrical current sensor, an electrical voltage sensor, or a power usage sensor;
a lamp comprising a source of ultraviolet radiation, the sensor being located on the source of ultraviolet radiation,
a processor operatively coupled to the lamp; and
a memory device that stores data and instructions executable by the processor and configured to:
identify, based upon input corresponding to the source of ultraviolet radiation and received from the sensor, a characteristic of the source of ultraviolet radiation, wherein the characteristic comprises at least one of: an operating condition of the source of ultraviolet radiation and an environmental condition of the source of ultraviolet radiation;
produce, from the lamp, a command based upon the characteristic, wherein the command comprises a command to control a characteristic of a power supply operatively coupled to the ultraviolet lamp assembly; and
modulate, based upon the command, the power supply.

21. A product for controlling a power supply for at least one ultraviolet lamp, comprising:
a storage device having code stored therewith, the code being executable by a processor and comprising:
code that identifies, based upon input corresponding to at least one ultraviolet lamp and received from at least one sensor located on the at least one ultraviolet lamp, a characteristic of the at least one ultraviolet lamp, wherein the characteristic comprises at least one of: an operating condition of the at least one ultraviolet lamp and an environmental condition of the at least one ultraviolet lamp;

code that produces, from the at least one ultraviolet lamp, a command based upon the characteristic, wherein the command comprises a command to control at least one characteristic of a power supply operatively coupled to the at least one ultraviolet lamp; and code that modulates, based upon the command, the power supply.

\* \* \* \* \*